(12) United States Patent
Hwang et al.

(10) Patent No.: US 6,208,792 B1
(45) Date of Patent: Mar. 27, 2001

(54) ARTICLE COMPRISING A PLANAR OPTICAL WAVEGUIDE WITH OPTICALLY NON-LINEAR CORE

(75) Inventors: Harold Yoonsung Hwang, Hoboken; Gadi Lenz, Fanwood; Malcolm Ellis Lines, Millington; Richart Elliott Slusher, Lebanon, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/399,625

(22) Filed: Sep. 20, 1999

(51) Int. Cl.$^7$ ..................................................... G02B 6/10
(52) U.S. Cl. ........................... 385/129; 385/142; 385/130
(58) Field of Search ..................................... 385/129, 130, 385/142; 501/40

(56) References Cited

U.S. PATENT DOCUMENTS

| | | | |
|---|---|---|---|
| 5,732,179 | * | 3/1998 | Caneau et al. ......................... 385/131 |
| 6,108,474 | * | 8/2000 | Eggleton et al. ....................... 385/122 |

FOREIGN PATENT DOCUMENTS

| 3-21934 | 1/1991 | (JP) .................................. G02F/1/35 |
|---|---|---|

OTHER PUBLICATIONS

"Photonic Packet Switching", *Optical Networks—A Practical Perspective*, Published by Morgan Kaufmann Publishers, Inc., pp. 515–531 (1998).

"The Physics of Amorphous Solids" by R. Zallen, published by John Wiley & Sons, pp. 266.

"Optical Oscillator Strengths and Excitation Energies in Solids, Liquids, and Molecules", by S. H. Wemple, *The Journal of Chemical Physics*, vol 67, No. 5, pp. 2151–2168 (Sep. 1, 1977).

* cited by examiner

*Primary Examiner*—Cassandra Spyrou
*Assistant Examiner*—Nasreen Parvin
(74) *Attorney, Agent, or Firm*—Eugen E. Pacher

(57) ABSTRACT

Waveguides according to this invention have a chalcogenide glass core that comprises Se and one or both of As and Ge, and further comprises one or more dopant elements selected from the elements that cause a change in optical energy gap $E_g$ of the glass core. The amount of dopant is selected such that $E_g$ is equal to or less than a 2-photon energy $2h\nu$, where h is Planck's constant and $\nu=c/\lambda$, where c is the speed of light in vacuum and $\lambda$ is an operating wavelength. The dopant elements furthermore are selected such that the chalcogenide glass core has a nonlinear refractive index $n_2$ greater than $200n_2$ ($SiO_2$), where $n_2$ ($SiO_2$) is the nonlinear index of silica at $\lambda$. Typically, $\lambda$ is about 1.55 $\mu$m. Exemplary, the dopant elements are selected from Sb, Bi, Sn, Pb, In, Tl, Cu, Ag and S. Currently preferred dopants are Te, Sb, Tl, Cu and Ag. Waveguides according to the invention are advantageously used in all-optical switches, optical logic elements and other means for optical processing of optical pulses.

9 Claims, 6 Drawing Sheets $As_y Se_{1-y}$

ARTICLE COMPRISING A PLANAR OPTICAL WAVEGUIDE WITH OPTICALLY NON-LINEAR CORE

FIELD OF THE INVENTION

This application pertains to articles (e.g., an all-optical fiber switch for an optical fiber communication system) that comprise an optical waveguide (typically a planar optical waveguide) with optically non-linear core.

BACKGROUND

Switching of optical pulses is an essential functionality of substantially any practical optical fiber communication system. Current technology limits practical electronic switching speeds to about 40 Gbit/s. Thus, in order to attain single channel bit rates higher than about 40 Gbit/s, it is necessary to develop the ability to switch and process optical pulses at speeds substantially higher than 40 Gbit/s.

This application discloses means for ultra fast switching and/or processing (collectively "switching") of optical pulses, exemplarily permitting sub-picosecond switching times.

Japanese Kokei Patent Application No. Hei 3 [1991]-21934 discloses nonlinear optical devices comprising Ge, As, S and Se-containing chalcogenide nonlinear material.

All cited references are incorporated herein by reference.

SUMMARY OF THE INVENTION

All-optical switching (i.e., switching of an optical signal pulse with an optical control pulse) in principle can be made ultra-fast.

Typically, signal and control light propagate together through an optical waveguide comprising an optically nonlinear core material. Of particular interest herein are planar optical waveguides.

The refractive index n of a nonlinear material is conventionally expressed as $n_0+n_2I$, wherein I is the optical intensity (in W/cm$^2$), $n_2$ is the nonlinear refractive index (in cm$^2$/W), and $n_0$ is the conventional linear refractive index. Similarly, the nonlinear attenuation $\alpha$ of a material is expressed as $\alpha_0+\alpha_2I$, wherein $\alpha_2$ is the nonlinear attenuation (in cm/W), and $\alpha_0$ is the conventional linear attenuation (in cm$^{-1}$). It will be understood that typically the above parameters are wavelength-dependent.

Using the fact that an all-optical switching device of the type that is of interest herein typically utilizes a phase shift of order $\pi$, it can be deduced that such a device requires a waveguide of length L equal to about $\lambda/2n_2 I$, where $\lambda$ is the optical wavelength in vacuum. In fiber devices L can be quite long, but in planar waveguide devices L desirably should be no more than about 1 cm. Furthermore, devices of interest herein will typically operate at a wavelength at or near 1.55 $\mu$m, exemplarily in the range 1.45–1.65 $\mu$m. For the sake of concreteness, in the discussion below it will be assumed that $\lambda=1.55$ $\mu$m. Still furthermore, a reasonable light intensity I is about 1 GW/cm$^2$, and an acceptable attenuation ao is less than about L$^{-1}$.

For an operating wavelength at which the nonlinear attenuation of a given waveguide core material dominates, the above requirements lead to the inequality $(\alpha_2\lambda/2n_2)<1$, and for a wavelength at which the linear attenuation dominates, the requirements lead to the inequality $(\alpha_0\lambda/2n_2I)<1$. In both cases it is clearly desirable if $n_2$ is relatively large, typically more than several 100 times larger than the nonlinear refractive index of silica, designated $n_2$ (SiO$_2$), which is about 2.8×10$^{-16}$ cm$^2$/W at 1.55 $\mu$m. Furthermore, $\alpha$ desirably is not more than about 1 cm$^{-1}$.

We have carried out a theoretical analysis of the optical properties of some chalcogenide glasses and have determined that some such glass can meet the above recited requirements, and thus can be used as nonlinear core material in a planar waveguide for all-optical switching.

More specifically, the invention is embodied in an article that comprises a planar waveguide adapted for guiding light of vacuum wavelength $\lambda$ in the range 1.45–1.65 $\mu$m. The planar waveguide comprises a nonlinear core material having at $\lambda$ a refractive index $n=n_0+n_2I$, where $n_0$ is the linear refractive index, $n_2$ is the nonlinear refractive index, and I is the intensity of guided light in the waveguide.

Significantly, the nonlinear core material is a chalcogenide glass comprising selenium and a member of the group consisting of arsenic, germanium, and arsenic and germanium. Associated with the chalcogenide glass is an optical energy gap $E_g$. See, for instance, R. Zallen, "The Physics of Amorphous Solids", John Wiley and Sons, New York, 1983, especially p. 266. The chalcogenide glass further comprises one or more dopant elements selected from the group of elements whose presence in the chalcogenide glass results in a change in $E_g$. The amount of the one or more dopant elements in the doped chalcogenide glass is selected such that $E_g$ is substantially equal to a two-photon energy 2hv, where h is Planck's constant and $v=c/\lambda$, where c is the speed of light in vacuum, and the amount is furthermore selected such that the doped chalcogenide glass has a nonlinear refractive index $n_2$ greater than 200$n_2$ (SiO$_2$), preferably greater than 400$n_2$ (SiO$_2$), where $n_2$(SiO$_2$) is the nonlinear refractive index of vitreous silica at about 1.55 $\mu$m.

Exemplary dopant elements are tellurium, antimony, thallium, copper, silver and sulfur. Of the recited exemplary dopant elements, all but S reduce $E_g$.

It should be understood that the prior art contains data on some of the optical properties of substantially any chalcogenide glass of interest herein, including data on some effects of doping. However, to the best of our knowledge, nothing in the prior art suggests a technique for evaluating the nonlinearity of a given chalcogenide glass and, significantly, nothing suggests the use of chalcogenide glass of sufficiently large nonlinearity as core material of a planar optical waveguide, the planar waveguide for instance being used for all-optical pulse switching or processing.

BRIEF DESCRIPTION OF THE DRAWINGS

FIGS. 5, 6 and 7 are not intended to be to scale or in proportion.

DETAILED DESCRIPTION

We have carried out an extensive theoretical analysis of the optical properties of chalcogenide glasses and have concluded that at least some chalcogenide glasses can be advantageously used in all-optical switches. In particular, we have found that there are two material parameters that are of particular importance in a chalcogenide glass for all-optical switching. These are the optical energy gap $E_g$ of the chalcogenide glass (also referred to as the Tauc energy gap) and the linear refractive index no of the glass. Appropriate choice of these (and optionally other) material parameters can result in highly nonlinear glass with relatively small attenuation for light of predetermined wavelength $\lambda$, typically about 1.55 $\mu$m. Such material can be advantageously used as the nonlinear core material in a planar waveguide for all-optical switching.

Figure 1:
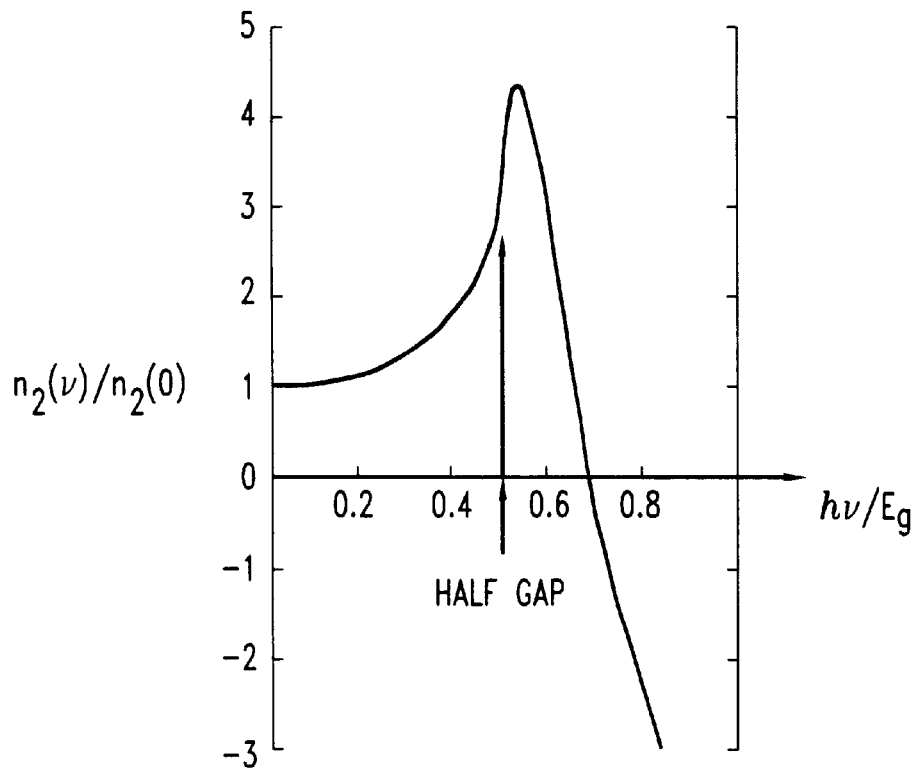
FIG. 1 shows the frequency dependence of the nonlinear refractive index $n_2$ as a function of the ratio of optical energy to bandgap.

Our theoretical analysis inter alia yielded the following expression for the nonlinear refractive index $n_2(x)$:

$$n_2(x) = 0.6(n_0^2+2)^3(n_0^2-1)(d/n_0E_s)^2 F(x), \qquad 1)$$

in units of $n_2(SiO_2)$. In this expression, $x = h\nu/E_g$, $h\nu$ is the photon energy, $n_0$ is the linear refractive index as x goes to zero, $E_s$ (in eV) is the Sellmeier energy gap, $d$(in $\mu$m) is the mean bond length of the bonds that are primarily responsible for the dielectric response of the material, and the function $F(x)$ is shown in FIG. 1.

From the expression $$n_0^2(\nu) - 1 = E_d E_s/(E_s^2 - h^2\nu^2) \qquad 2)$$

the Sellmeier energy gap can be determined experimentally from the long wavelength frequency dependence of the electronic linear response, while the energy parameter $E_d$ (in eV) can be determined by extrapolation to zero frequency, yielding $$E_d = E_s(n_0^2 - 1). \qquad 3)$$

As can be seen from FIG. 1, $F(x)$ (and thus $n_2(x)$) increases rapidly as x approaches 0.5 from below. Values of x greater than 0.5 permit 2-photon absorption and are therefore undesirable in the context of high intensity devices, due to the resulting large attenuation.

A principal result of our theoretical analysis is the recognition that chalcogenide glass having an optical gap $E_g$ at or near the two-photon energy $2h\nu$ of the operating light (typically about 1.55 $\mu$m) can have a large nonlinearity and is a candidate for all-optical switching, provided the attenuation is small enough to meet practical requirements.

Equation (1) also shows that $n_2$ increases with increasing bond length d. Thus, it is desirable to maximize d.

Equation (1) above shows that the value of the optical gap is an important parameter for choice of a nonlinear material, but it also shows that other parameters typically are also important. The Sellmeier gap $E_s$ desirably is small, since both $n_2$ and $n_0$ increase with decreasing $E_s$. However, $E_s$ scales to a significant degree with $E_g$. This conclusion follows from the recognition that $E_s$ measures the mean gap between the dielectrically active energy levels near the top of the valence band and those near the bottom of the conduction band, while $E_g$ is a measure of the minimum gap. For instance, in chalcogenides, $E_s/E_g$ typically is confined to a range a little above 2, exemplarily 2.2–2.6.

Figure 2:
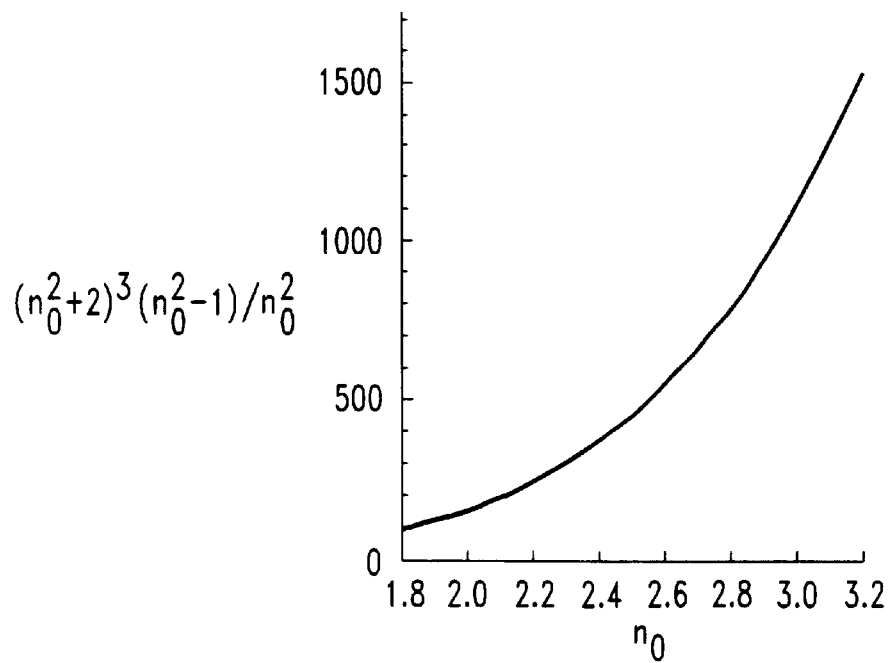
FIG. 2 shows the functional dependence of $n_2(0)$ on $n_0$.
Figure 3A:
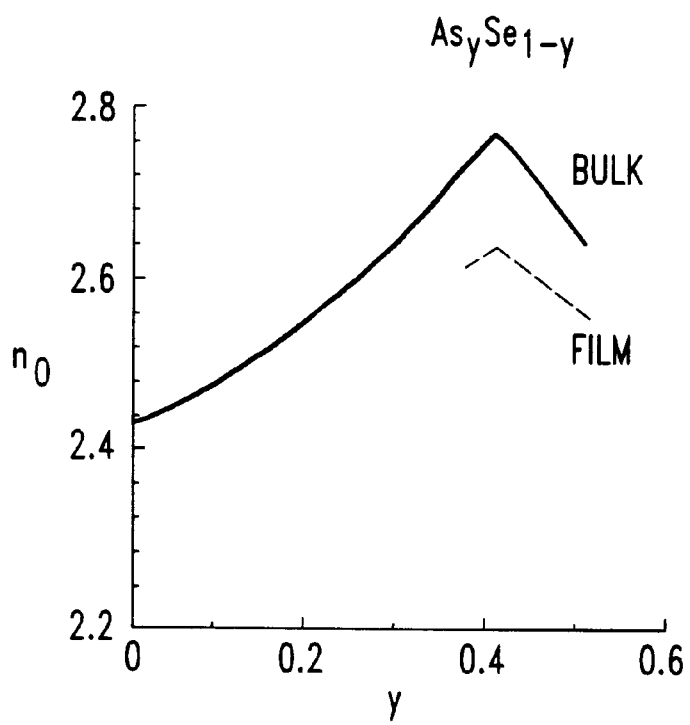
FIGS. 3a–3d show approximate materials parameters as a function of composition for As$_y$Se$_{1-y}$.
Figure 3B:
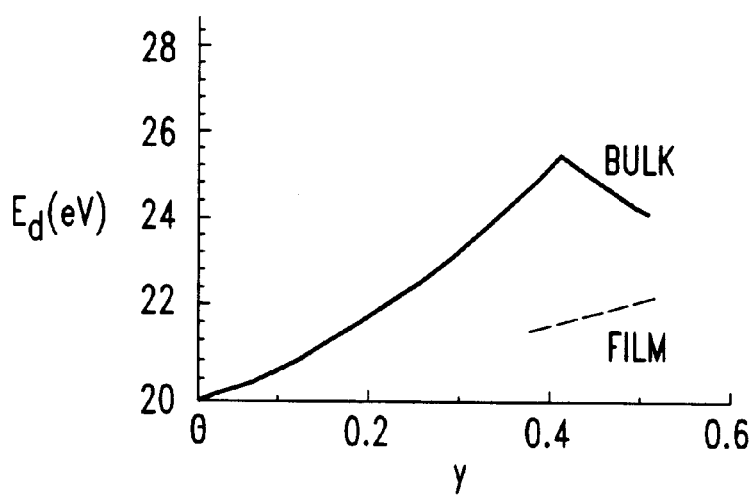
Figure 3C:
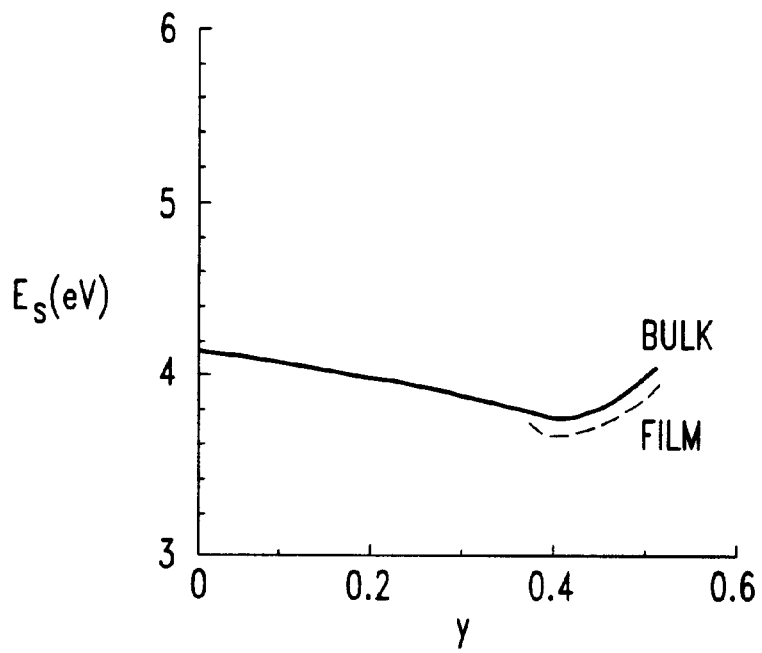
Figure 3D:
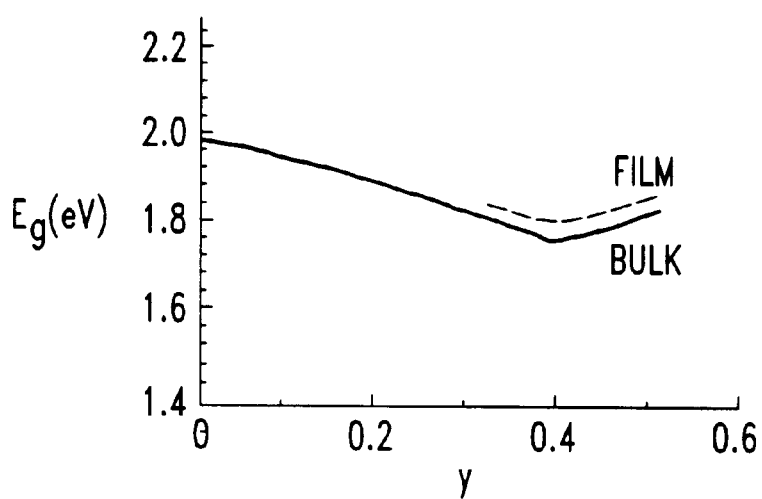
Figure 4A:
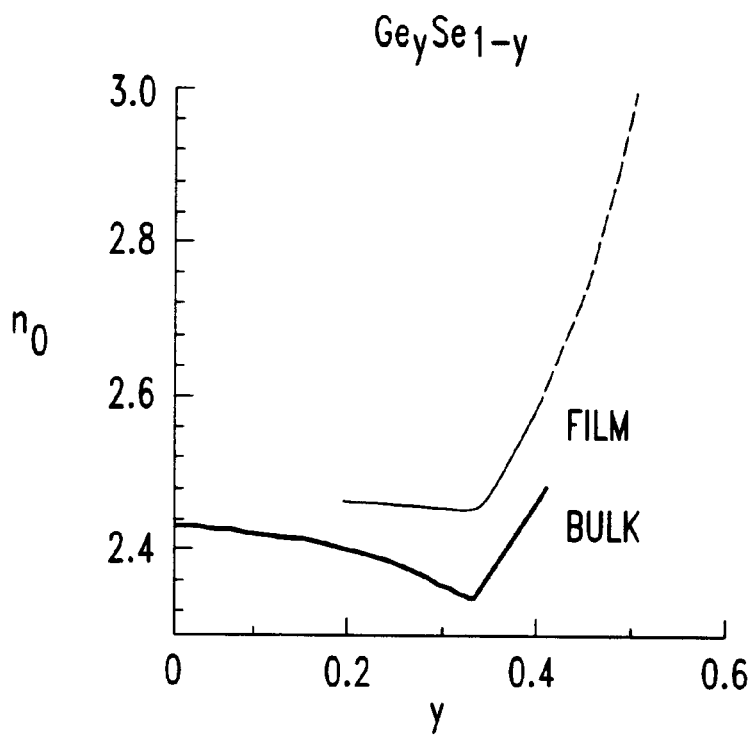
FIGS. 4A–4d show approximate materials parameters as a function of composition for Ge$_y$Se$_{1-y}$.
Figure 4B:
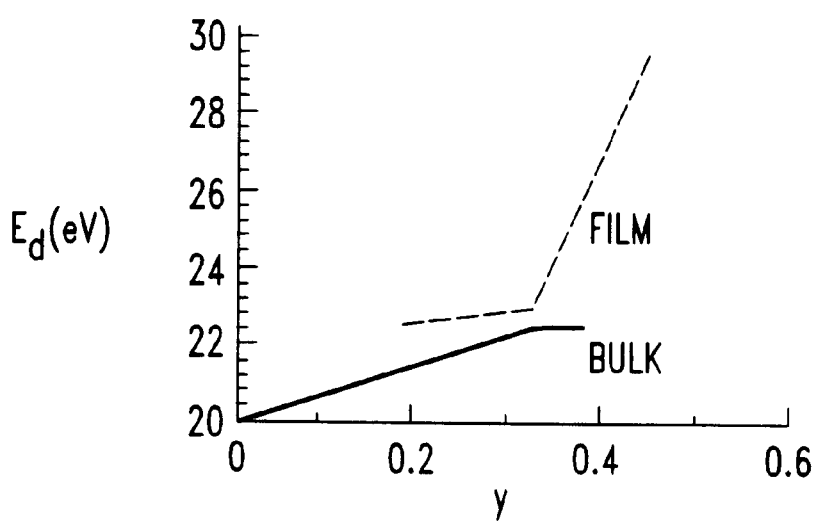
Figure 4C:
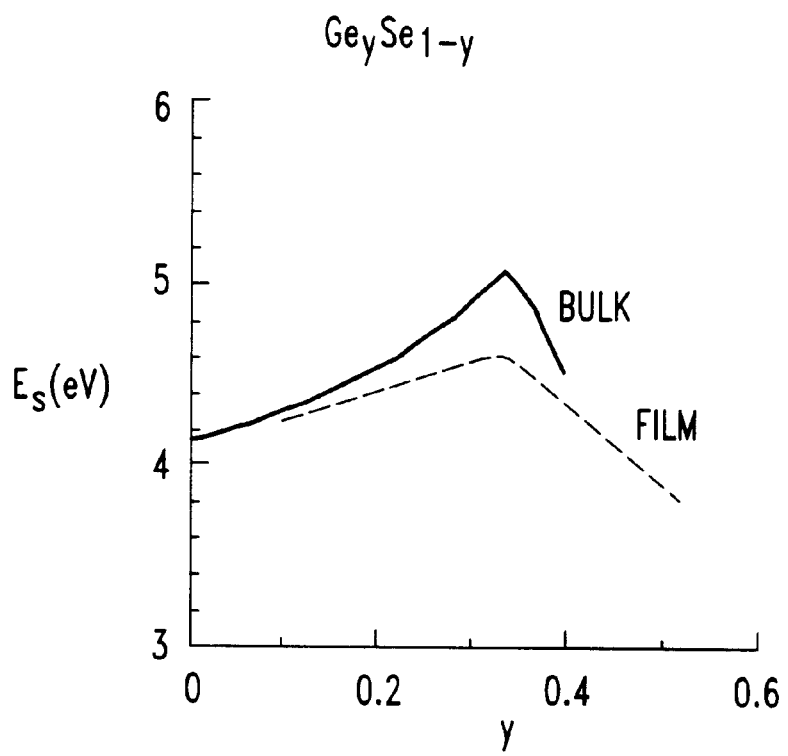
Figure 4D:
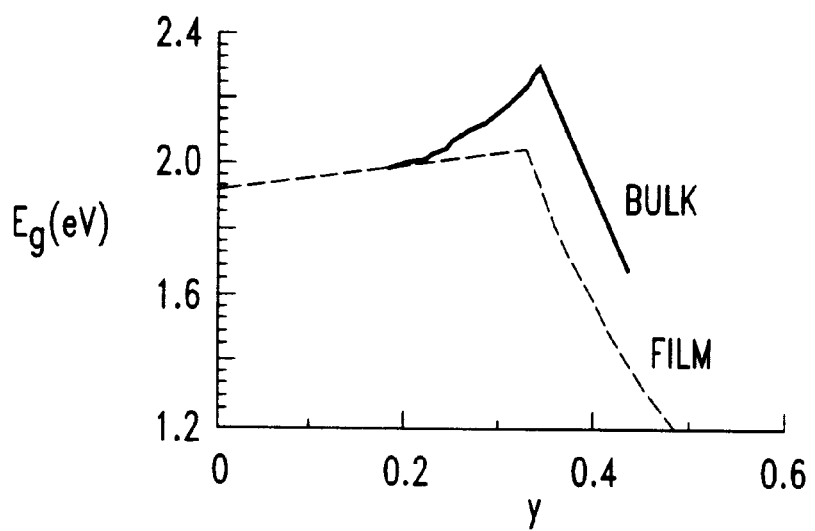

From equation (1) it also follows that $n_2(0)$ is proportional to $(n_0^2+2)^3(n_0^2-1)/n_0^2$, and thus is a sensitive function of the linear refractive index $n_0$, as can be seen from FIG. 2. Desirably, $n_0$ is as large as possible, commensurate with the selected $E_g$.

From equation (2) one can see that $n_0$ is also significantly influenced by the energy parameter $E_d$. It has been shown that $E_d$ increases with the number of (electronically active) valence electrons per anion, the bond coordination number of the anion, and the degree of covalence of the bonds involved in the electronic response. See, for instance, S. H. Wemple, *J. Chemical Physics,* Vol. 67, page 2151 (1977).

In summary, our analysis shows that a chalcogenide glass for all-optical switching of light of wavelength $\lambda$ desirably is selected to have an optical gap (Tauc gap) $E_g$ at or just below the 2-photon energy $2h\nu$. For $\lambda=1.55$ $\mu$m, the 2-photon energy is about 1.6 eV.

The analysis also shows some desirable optional conditions, namely, a relatively high anion coordination number; a relatively large number of valence electrons per anion; a relatively high degree of covalency; and relatively long (covalent) bonds.

Furthermore, it is important that the chalcogenide glass be substantially free of any tendency towards actual or incipient phase separation, exhibit substantially no microcrystallinity, and have a glass transition temperature sufficiently above ambient temperature for the glass to be stable under anticipated operating conditions.

The above discussion of the theoretical analysis is provided for tutorial purposes only and is not meant to limit the scope of the claims.

Of the four principal binary chalcogenide glass-forming compositions (namely As—S, As—Se, Ge—Se and P—Se), only two (namely As—Se and Ge—Se) have $E_g$ small enough (less than 2 eV) to make them potentially useful for optical switching.

Our calculations show that for bulk $As_ySe_{1-y}$ the maximum value of $n_2$ at $\lambda=1.55$ $\mu$m is about 430 times $n_2(SiO_2)$ at $As_2Se_3$, with $E_g=1.74$ eV. However, such a high value of $n_2$ may not be attainable in the thin-film context, since glassy thin film $As_ySe_{1-y}$ is expected to exhibit decreased packing density (as expressed by $E_d$), as compared to bulk material.

Similarly, our calculations show that for bulk $Ge_ySe_{1-y}$ the maximum value of $n_2$ at $\lambda=1.55$ $\mu$m is about 160 times $n_2$ ($SiO_2$) at about $Ge_2Se_3$, with $E_g=1.9$ eV. Pseudo-binary chalcogenide $(As,Ge)_ySe_{1-y}$ is expected to have intermediate $E_g$.

The above remarks indicate that the chalcogenide glasses As—Se, Ge—Se and (As,Ge)—Se have relatively high nonlinearity. They also have relatively low values of attenuation.

The above recited numerical values of $n_2$ pertain to bulk material, and $n_2$ is expected to be somewhat less for most of the respective chalcogenide glasses in thin film form. Nevertheless, the above mentioned chalcogenide glasses may have utility as nonlinear core material in planar waveguides for all-optical switching, but are not preferred.

It would be desirable to have available chalcogenide glass compositions that have even higher non-linearity, together with relatively low attenuation, even in thin film form. We have found that this is possible by appropriate doping of the binary (or pseudo-binary) chalcogenide glass base composition, and preferred embodiments of our invention comprise such doped chalcogenide glass.

More specifically, we have found that doping can be used to tune $E_g$ to a value at, or close to, the 2-photon energy.

Furthermore, doping can optionally be used to enhance $E_d$, either via improved packing efficiency or by increasing the mean number of electronically active valence electrons per anion. Doping can optionally also be used to increase the mean bond length of the strongly electronically active bonds and to substantially maintain or improve the homogeneous glass-forming capability of the glass.

It will be understood that a given dopant will not necessarily provide all of the above recited improvements. In view of the strong dependence of $n_2$ on $E_g$ near the 2-photon energy, the first of the above condition will generally be the most important one.

Tellurium can be incrementally substituted for Se in both As—Se and Ge—Se, and is currently the preferred $E_g$-decreasing anionic dopant. Exemplarily, the composition $As_2(Se_{1-z}Te_z)_3$ can be tuned to $E_g \sim 1.6$ (eV) for z approximately equal to 0.15. For this composition the following approximate parameter values pertain:

$n_0 = 2.90$ $E_s = 3.6$ $E_g = 1.6$ $d = 2.46$ $x = 0.5$ $F(x) = 3.4$, yielding $n_2$ of about $950 n_2$ $(SiO_2)$. Other compositions $As_ySe_{1-y}$, $Te_z$ in the compositional vicinity of $y \sim 0.4$ and $z \sim 0.09$ can also have large values of $n_2$, as can Te-doped Ge—Se compositions.

Exemplary cationic dopants for $E_g$-reduction in As—Se and Ge—Se chalcogenide glasses are Sb, Bi, Sn, Pb, In, Tl, Cu and Ag. However, cationic dopants other than Sb, Tl, Cu and Ag rapidly destabilize the selenide glasses with increasing dopant concentration, and thus are not preferred.

Exemplarily, Sb-doped chalcogenide glass of composition $(1-y) As_2Se_3.ySb_2Se_3$ can form homogeneous glasses for $y<0.45$, with $E_g$ being about 1.6 eV at $y \sim 0.1$. Antimony-doping of As—Se glass is expected to yield a maximum value of $n_2$ of about $650n_2(SiO_2)$. Similar behavior (but with somewhat smaller maximum $n_2$) is expected for Sb-doped Ge—Se.

As—Se glass can be tuned to $E_g = 1.6$ eV by addition of only a few atomic percent of Tl. The doped glass is expected to have $n_2 \sim 700$ $n_2(SiO_2)$. Ge—Se requires considerably more Tl than As—Se. maximum $n_2$ is expected to exist close to $GeTlSe_2$, and to have a value of about $600n_2$ $(SiO_2)$.

Both copper and silver reduce $E_g$ in As—Se glass and can be used to tune $E_g$ to 1.6 eV, but Cu reduces $E_g$ more efficiently than Ag. The amount of Cu will typically be in the range 5–15 atomic percent. A maximum value of $n_2$ of about $700n_2(SiO_2)$ is expected. Similar results are expected for copper or silver-doped Ge—Se, but a larger dopant concentration is typically required.

The above-discussed dopants reduce $E_g$ and thus can be used to achieve $E_g = 1.6$ eV in chalcogenide glass having $E_g > 1.6$ eV. On the other hand, partial substitution of sulfur for selenium increases $E_g$, and thus can be used to achieve $E_g = 1.6$ eV in chalcogenide glass having $E_g < 1.6$ eV.

FIGS. 3a–3d show approximate values of some materials parameters ($n_0$, $E_d$, $E_s$ and $E_g$) as a function of composition for the binary chalcogenide glass $As_ySe_{1-y}$, and FIGS. 4a–4d show approximate values of the same parameters for the binary chalcogenide glass $Ge_ySe_{1-y}$. The data presented in the above recited figures will be useful in the practice of the inventions since it can facilitate choice of an appropriate base material for doping. Once an appropriate base material is selected, a minor amount of routine experimentation will generally suffice to find doped material according to the invention.

Figure 5:
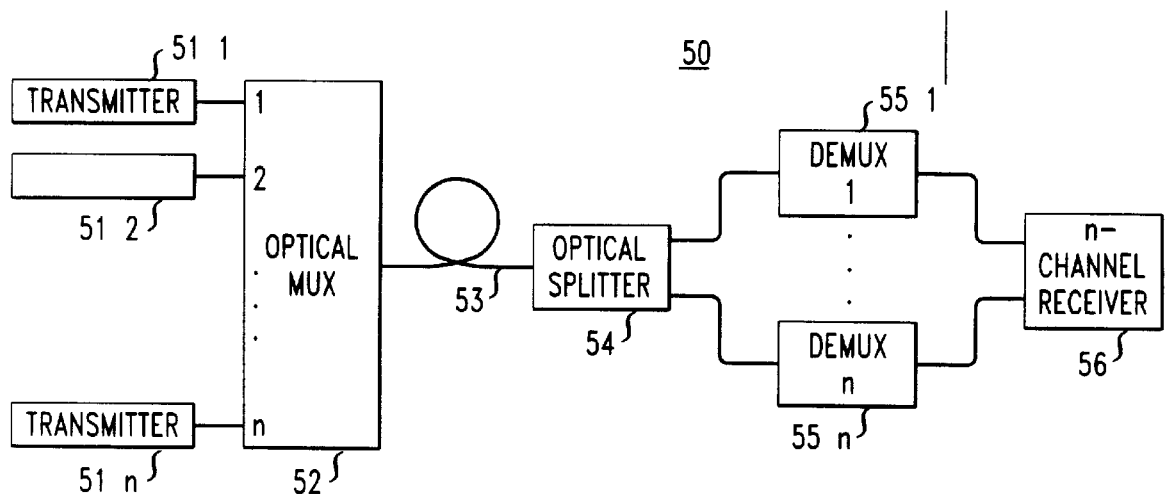
FIG. 5 schematically depicts an exemplary optical fiber communication system comprising all-optical switches according to this invention.

FIG. 5 schematically depicts an exemplary optical time division multiplexed (OTDM) fiber communication system 50 that comprises all-optical switches. Numerals 511–51n refer to transmitters operating at electronic bit rates, e.g., 10 Gb/s, with n being the number of channels, exemplarily 10. Optical signals from the transmitters are provided to optical multiplexer 52 and are interleaved in time. The interleaved optical data stream (exemplarily 100 Gb/s) is coupled into optical fiber 53 and transmitted therethrough to optical splitter 54, where it is split into n optical data streams. Each of the data streams is guided to one of optical demultiplexers 551–55n, where the data stream is optically demultiplexed. It will be understood that the demultiplexers 551–55n are nonlinear optical switches according to the invention. The demultiplexed optical data streams (exemplarily 10 Gb/s) are then provided to conventional n-channel receiver 56.

Figure 7:
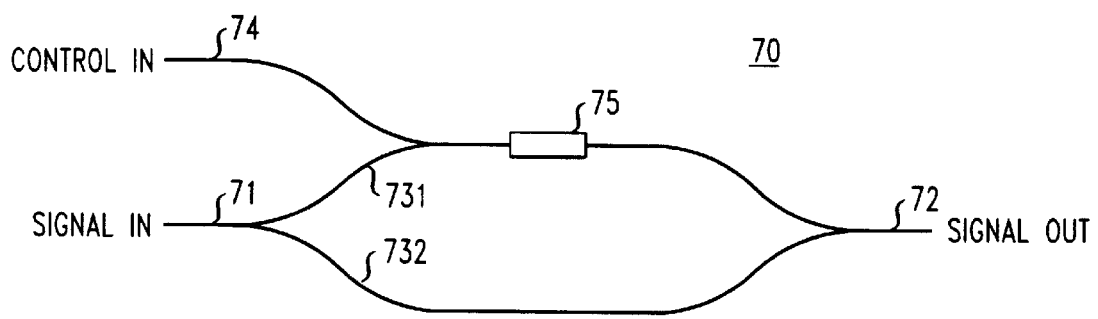
FIG. 7 schematically illustrates an optical time division multiplexer according to the invention.

FIG. 7 schematically illustrates an optical switch 70 (more specifically an optical time division demultiplexer) according to the invention. Splitter 71 splits the OTDM data stream into two substantially identical data streams that propagate through a Mach-Zehnder-type device to output port 72. In the absence of a control pulse, arms 731 and 732 are of essentially the same optical length. Numeral 75 refers to a length of nonlinear waveguide according to the invention. In the presence of a control pulse the two arms of the Mach-Zehnder-type device are not of the same optical path length, but exemplarily exhibit a $\pi$ phase difference, resulting in destructive interference at the output. Alternatively, the device could be designed with a built-in phase difference of $\pi$, with the presence of a control pulse resulting in a change in the optical path length of arm 731 such that the pulses constructively interfere at the output. For more detail on optical demultiplexing see, for instance, R. Ramaswami et al., "Optical Networks-A Practical Perspective", Morgan Kanfman Publishers, Inc., San Francisco, Calif., 1998, especially pp. 515–531.

Figure 6:
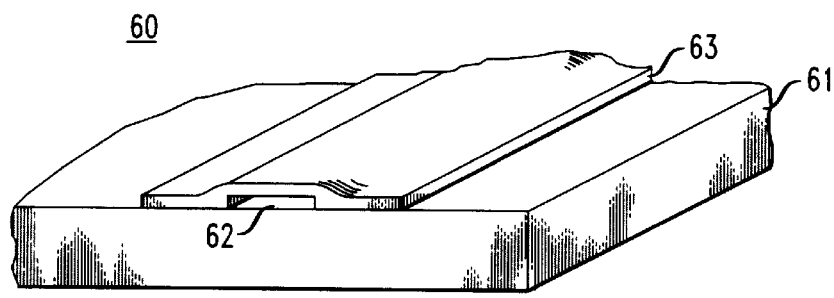
FIG. 6 schematically shows an exemplary planar optical waveguide according to the invention.

FIG. 6 schematically shows an exemplary planar waveguide 60 according to the invention. Numerals 61–63 respectively refer to the substrate (exemplarily Si), the nonlinear chalcogenide glass core, and the upper cladding (exemplarily a lower refractive index chalcogenide glass). Such a waveguide structure can be readily made by known methods, exemplarily including sputter deposition of a doped chalcogenide layer, patterning of the layer by photolithography and etching, and deposition of the upper cladding layer by sputtering, optionally followed by patterning by means of photolithography and etching.

We claim:

1. Article comprising a planar waveguide adapted for guiding radiation of vacuum wavelength $\lambda$, the planar waveguide having a chalcogenide glass core comprising Se and a member of a group consisting of As, Ge, and As and Ge;

CHARACTERIZED IN THAT the chalcogenide glass core further comprises one or more dopant elements selected from a group of elements that cause a change of an optical energy gap $E_g$ of said chalcogenide glass core, the amount of said dopant element being selected such that $E_g$ is equal to or less than a two-photon energy $2h\nu$, where h is Planck's constant and $\nu = c/\lambda$, where c is the speed of light in vacuum, and wherein the dopant element or elements are furthermore selected such that the chalcogenide glass core has a nonlinear refractive index $n_2$ greater than $200n_2(SiO_2)$, where $n_2(SiO_2)$ is the nonlinear refractive index of vitreous silica at $\lambda$.

2. Article according to claim 1, wherein λ is about 1.55 μm.

3. Article according to claim 1, wherein the chalcogenide glass core comprises As.

4. Article according to claim 1, wherein the one or more dopant elements are selected from Sb, Bi, Sn, Pb, In, Tl, Cu, Ag and S.

5. Article according to claim 4, wherein the one or more dopants are selected from Te, Sb, Tl, Cu and Ag.

6. Article according to claim 5, wherein the dopant is Te.

7. Article according to claim 1, wherein $n_2$ is greater than $400n_2(SiO_2)$.

8. Article according to claim 1, wherein the article is an optical switch.

9. Article according to claim 1, wherein the article is an optical time division multiplexed fiber communication system comprising a demultiplexer comprising said planar waveguide.

* * * * *